United States Patent
Shikanai et al.

(10) Patent No.: US 11,114,872 B2
(45) Date of Patent: Sep. 7, 2021

(54) CHARGING DEVICE

(71) Applicant: Panasonic Intellectual Property Management Co., Ltd., Osaka (JP)

(72) Inventors: Masaki Shikanai, Kanagawa (JP); Yoshinari Matsuyama, Osaka (JP); Takeshi Kikuchi, Osaka (JP); Yuzuka Isobe, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 0 days.

(21) Appl. No.: 16/865,782

(22) Filed: May 4, 2020

(65) Prior Publication Data
US 2020/0266641 A1    Aug. 20, 2020

Related U.S. Application Data

(63) Continuation of application No. PCT/JP2018/038551, filed on Oct. 16, 2018.

(30) Foreign Application Priority Data

Nov. 10, 2017 (JP) .............................. JP2017-217253

(51) Int. Cl.
*H01M 10/46* (2006.01)
*H02J 7/00* (2006.01)
*H01M 10/44* (2006.01)

(52) U.S. Cl.
CPC ........... *H02J 7/0044* (2013.01); *H01M 10/44* (2013.01); *H01M 10/46* (2013.01); *H02J 7/0045* (2013.01)

(58) Field of Classification Search
CPC ...... H02J 7/0044; H02J 7/0045; H01M 10/46; Y02E 60/10
(Continued)

(56) References Cited

U.S. PATENT DOCUMENTS

2016/0320801 A1* 11/2016 Buss ...................... F16M 11/18
2017/0117729 A1*  4/2017 Hirose .................... A63F 13/90
(Continued)

FOREIGN PATENT DOCUMENTS

JP        2015-15827        1/2015

OTHER PUBLICATIONS

International Search Report dated Jan. 8, 2019 in International (PCT) Application No. PCT/JP2018/038551.

*Primary Examiner* — Edward Tso
(74) *Attorney, Agent, or Firm* — Wenderoth, Lind & Ponack, L.L.P.

(57) ABSTRACT

A charging device includes: a connector that protrudes from a placement surface; a protective plate; a wall surface intersecting with the placement surface; a support member capable of moving to be in a first orientation in which the protective plate is supported and a second orientation in which the protective plate is not supported; and a lock mechanism that locks the support member in the first orientation. The lock mechanism includes a first protruding part that, when the support member is locked, releases the locking of the support member by being pushed. The support member (i) includes a second protruding part, and (ii) moves from the first orientation to the second orientation by the second protruding part being pushed toward the wall surface in a state where the locking is released. When the support member has moved, the protective plate is capable of moving to the placement stand.

10 Claims, 13 Drawing Sheets

(58) Field of Classification Search
USPC .................. 320/107, 112, 114, 115; D13/107
See application file for complete search history.

(56) References Cited

U.S. PATENT DOCUMENTS

2017/0163080 A1* 6/2017 Warren .................. H02J 50/90
2019/0273384 A1* 9/2019 Jyoti .................. H01M 50/207

* cited by examiner

CHARGING DEVICE

CROSS REFERENCE TO RELATED APPLICATIONS

This application is a U.S. continuation application of PCT International Patent Application Number PCT/JP2018/038551 filed on Oct. 16, 2018, claiming the benefit of priority of Japanese Patent Application Number 2017-217253 filed on Nov. 10, 2017, the entire contents of which are hereby incorporated by reference.

BACKGROUND

1. Technical Field

The present disclosure relates to a charging device that charges a rechargeable battery placed on a placement stand.

2. Description of the Related Art

Japanese Unexamined Patent Application Publication No. 201.5-15827 discloses a battery station including a plurality of chargers in which a plurality of batteries are loaded and which charge the plurality of batteries.

SUMMARY

The present disclosure provides a charging device that can effectively protect a connector for charging.

A charging device according to the present disclosure is a charging device that charges a storage battery placed on a placement stand, and includes: a connector that protrudes in a first direction from a placement surface of the placement stand and that electrically connects to a terminal of the storage battery placed on the placement stand; a protective plate disposed in a first position, the first position located further in the first direction than the connector; a wall surface extending in the first direction and a second direction substantially orthogonal to the first direction; a support member capable of moving to be in a first orientation and a second orientation, the support member supporting the protective plate in the first position when in the first orientation and not supporting the protective plate when in the second orientation; and a lock mechanism that locks the support member in the first orientation. The lock mechanism includes a first protruding part that, when the support member is locked, is disposed in a first protruding position protruding from the wall surface and that releases locking of the support member by being pushed from the first protruding position to a second protruding position closer to the wall surface than the first protruding position. The support member (i) includes a second protruding part disposed in a different position from the first protruding part in the second direction and protruding by an amount smaller than a distance from the wall surface to the second protruding position, and (ii) moves from the first orientation to the second orientation by the second protruding part being pushed toward the wall surface in a state where the locking by the lock mechanism is released. When the support member has moved to the second orientation, the protective plate is capable of moving to a second position closer to the placement stand than a first direction-side end part of the connector.

The charging device according to the present disclosure can effectively protect a connector for charging.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

An embodiment will be described in detail hereinafter with reference to the drawings where appropriate. There are, however, cases where descriptions are omitted when further detail is not necessary. For example, detailed descriptions of well-known items, redundant descriptions of substantially identical configurations, and so on may be omitted. This is to avoid unnecessary redundancy in the descriptions and facilitate understanding for those skilled in the art.

Note that the inventor(s) have provided the appended drawings and the following descriptions primarily so that those skilled in the art can sufficiently understand the present disclosure, and as such the content of the scope of claims is not intended to be limited by the drawings and descriptions in any way.

Embodiment

An embodiment will be described hereinafter with reference to FIGS. 1 to 12.

1. Configuration

Figure 1:
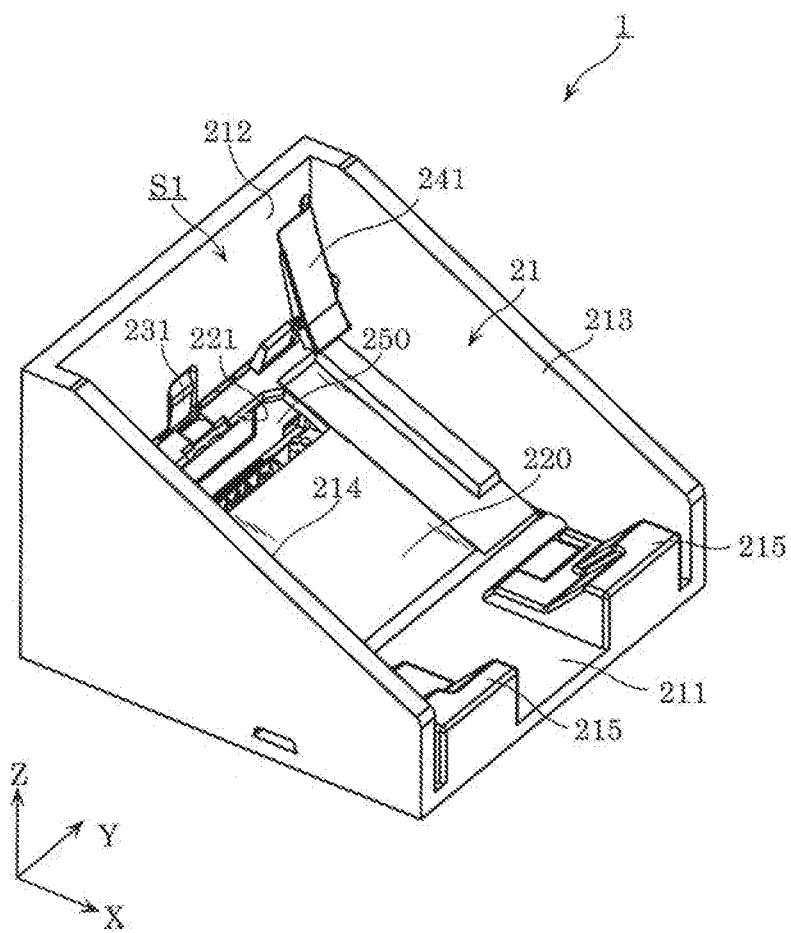
FIG. 1 is a diagram illustrating the external appearance of a charging device according to an embodiment.
Figure 2:
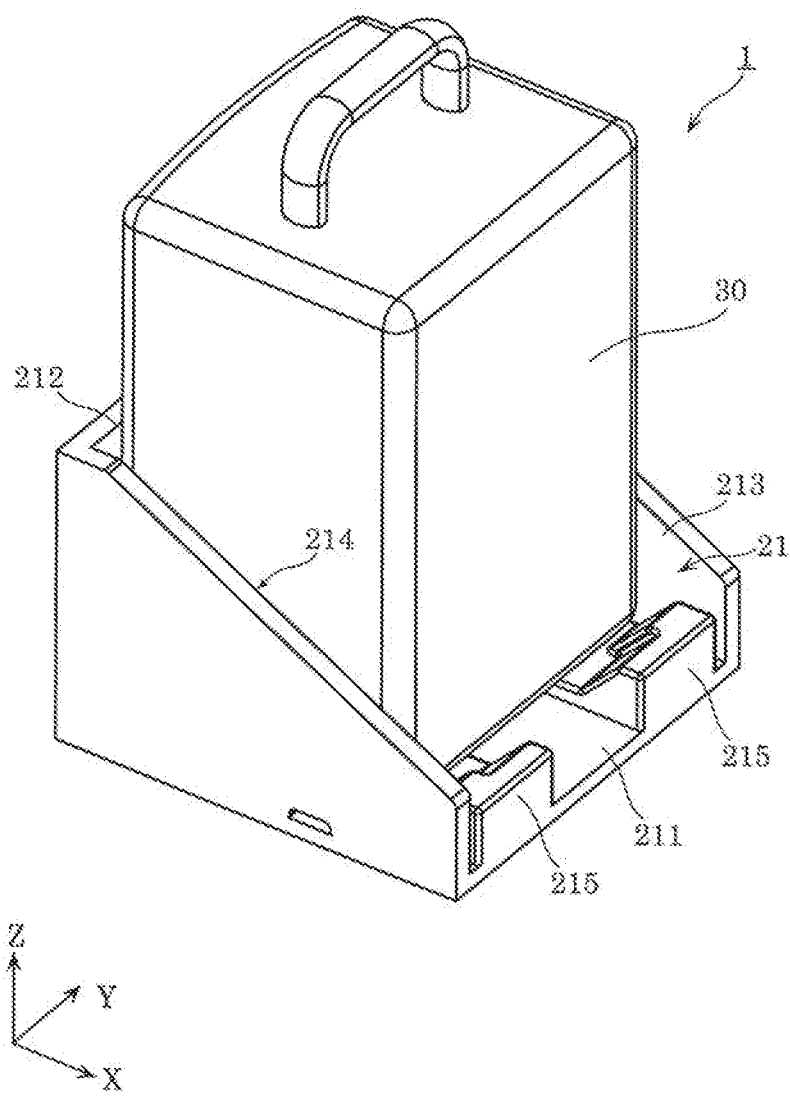
FIG. 2 is a perspective view of a placement stand in a state where a storage battery is placed on the placement stand.

FIG. 1 is a diagram illustrating the external appearance of a charging device according to the embodiment. Note that FIG. 1 is a perspective view of a placement stand in a state where a storage battery is removed from the placement stand. FIG. 2 illustrates the external appearance of the charging device in a state where the storage battery is placed on the placement stand. In the following, a vertical direction is taken as a Z-axis direction, with an upper side corresponding to a +Z-axis direction side and a lower side corresponding to a −Z-axis direction side. A depth direction is taken as an X-axis direction, with a front side corresponding to a +X-axis direction side and a rear side corresponding to a −X-axis direction side. A horizontal direction is taken as a Y-axis direction, with a right side corresponding to a +Y-axis direction side and a left side corresponding to a −Y-axis direction side. In the drawings, the sides to which the arrows in the X-axis direction, the Y-axis direction, and the Z-axis direction point are the positive sides, and the sides opposite therefrom are the negative sides. The X-axis direction, the Y-axis direction, and the Z-axis direction are directions substantially orthogonal to each other.

As illustrated in FIGS. 1 and 2, charging device 1 includes placement stand 21. Placement stand 21 houses various types of constituent elements, such as charging circuitry, for charging storage battery 30 of charging device 1.

Storage battery 30 is a battery pack containing a plurality of single cells. By being charged and discharging, storage battery 30 stores power, outputs stored power, and so on. Storage battery 30 is used in a vehicle that drives using, or for which the driving is assisted by, electric power, such as an electric bicycle, a power-assisted bicycle, an electric motorcycle, or the like. Storage battery 30 may be used in another electric device as well.

In charging device 1, when storage battery 30, which has been discharged through use or the like, is placed on placement stand 21, a terminal of storage battery 30 is electrically connected to a connector (described later) disposed in placement stand 21. Charging device 1 charges storage battery 30 via the stated connector.

The configuration of the charging device within the placement stand will be described next.

Figure 3:
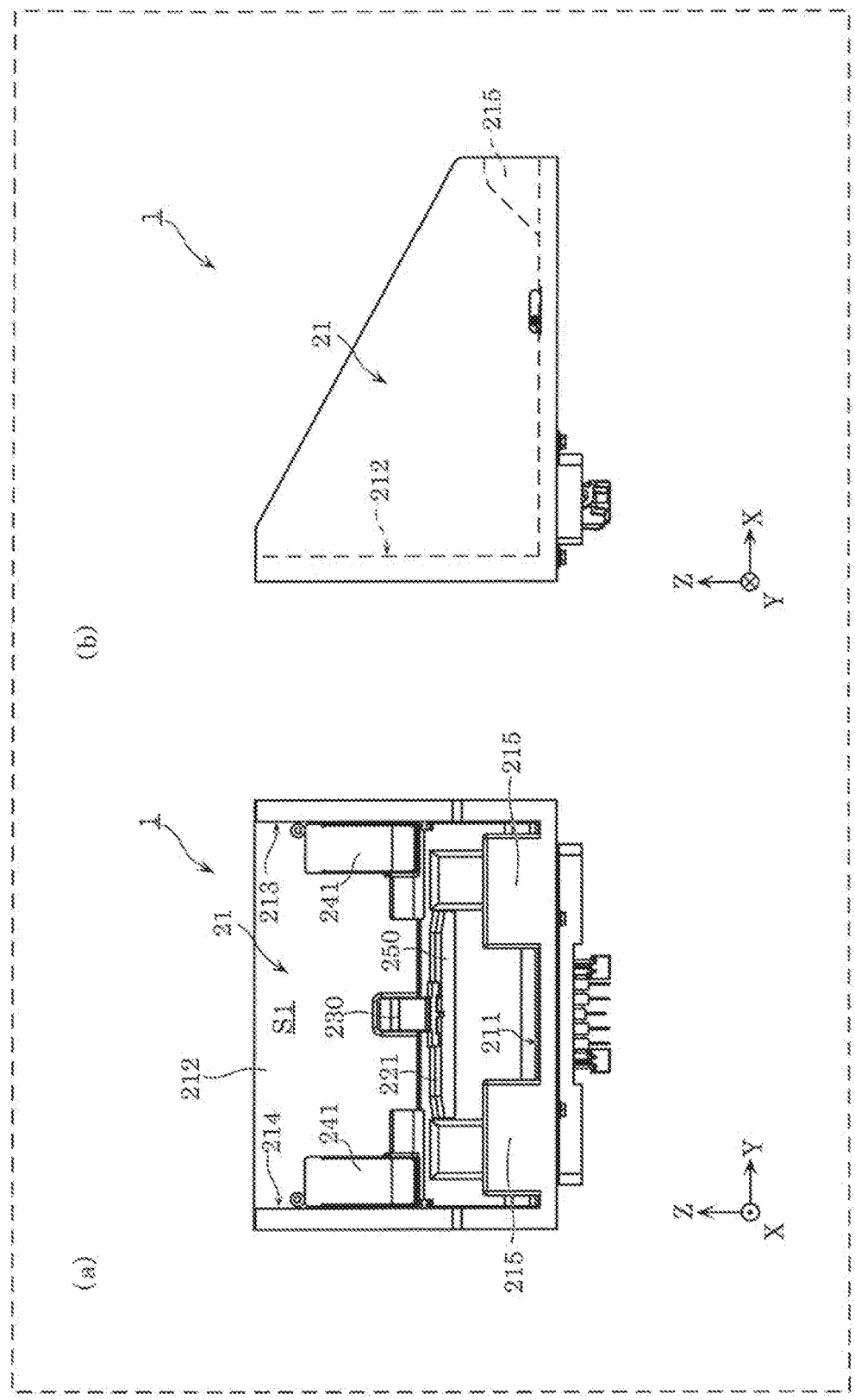
FIG. 3 illustrates a front view and a side view of the placement stand in a state where the storage battery is removed from the placement stand.
Figure 4:
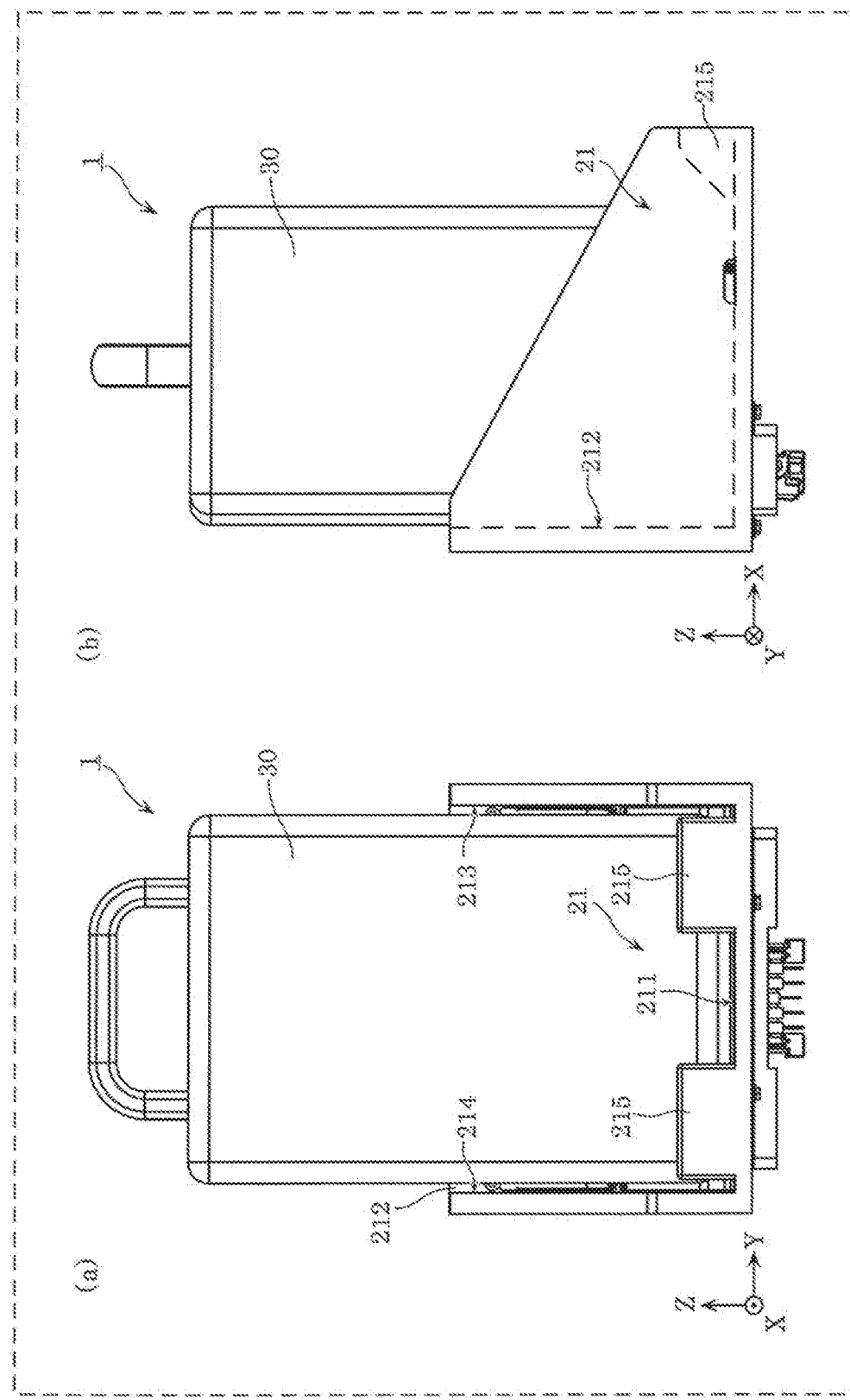
FIG. 4 illustrates a front view and a side view of the placement stand in a state where the storage battery is placed on the placement stand.
Figure 5:
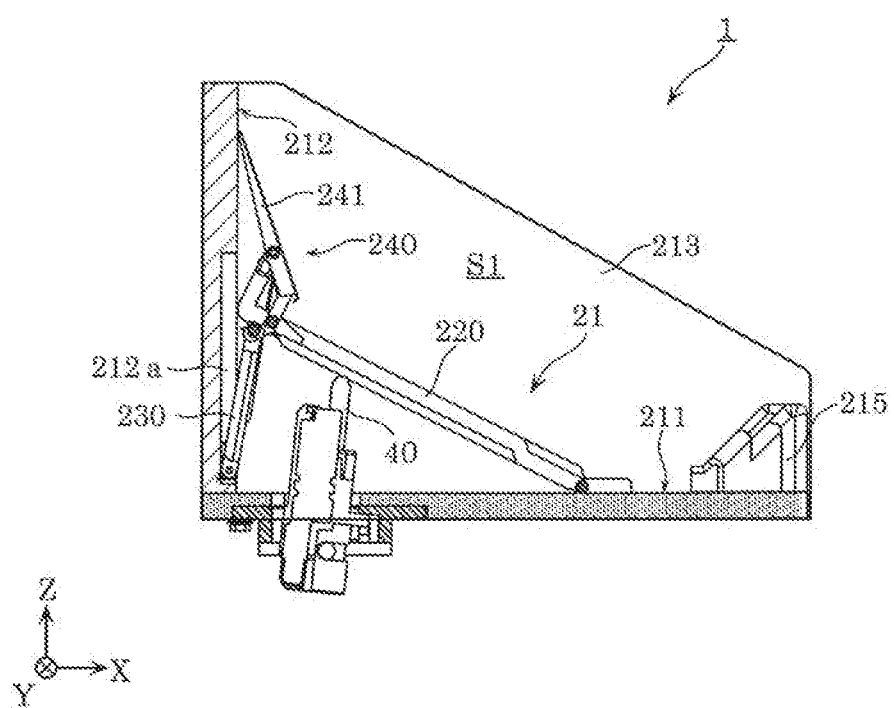
FIG. 5 is a cross-sectional view of the placement stand when the placement stand has been cut along an XZ plane, in a state where the storage battery is removed from the placement stand.
Figure 6:
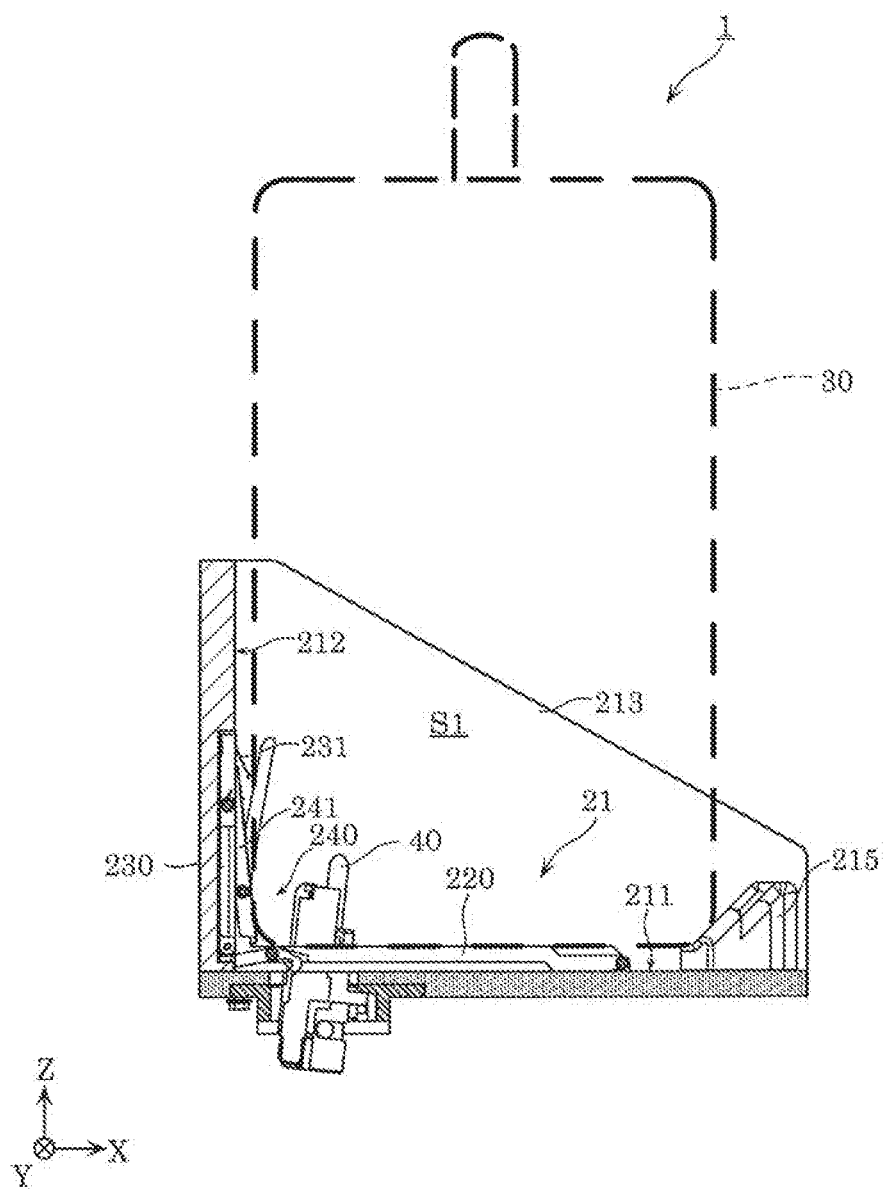
FIG. 6 is a cross-sectional view of the placement stand when the placement stand has been cut along an XZ plane, in a state where the storage battery is placed on the placement stand.

FIG. 3 illustrates a front view and a side view of the placement stand in a state where the storage battery is removed from the placement stand. FIG. 4 illustrates a front view and a side view of the placement stand in a state where the storage battery is placed on the placement stand. FIG. 5 is a cross-sectional view of the placement stand when the placement stand has been cut along an XZ plane, in a state where the storage battery is removed from the placement stand. FIG. 6 is a cross-sectional view of the placement stand when the placement stand has been cut along the XZ plane, in a state where the storage battery is placed on the placement stand.

In placement stand 21, charging device 1 includes connector 40, protective plate 220, first wall surface 212, support member 230, and a pair of lock mechanisms 240. Charging device 1 may further include second wall surface 213, third wall surface 214, first projecting parts 215, and shutter 250.

Placement stand 21 forms storage space S1, which is defined by placement surface 211, first wall surface 212, second wall surface 213, and third wall surface. Placement surface 211 is a base surface located at a base of storage space S1. Specifically, placement surface 211 is a surface coinciding with an XY plane and that is open on the +Z-axis direction side, i.e., a surface on the +Z-axis direction side of which storage space S1 is located.

First wall surface 212 is a surface opposing a side surface of a rear side of storage battery 30 when storage battery 30 is placed on placement stand 21. First wall surface 212 is a surface extending in the Z-axis direction and the Y-axis direction. Specifically, first wall surface 212 is a surface coinciding with a YZ plane and that is open on the +X-axis direction side, i.e., a surface on the +X-axis direction side of which storage space 81 is located.

Second wall surface 213 is a surface opposing a side surface of a right side of storage battery 30 when storage battery 30 is placed on placement stand 21. Second wall surface 213 is a surface extending in the Z-axis direction and the X-axis direction. Specifically, second wall surface 213 is a surface coinciding with the XZ plane and that is open on the −Y-axis direction side, i.e., a surface on the −Y-axis direction side of which storage space S1 is located.

Third wall surface 214 is a surface opposing a side surface of a left side of storage battery 30 when storage battery 30 is placed on placement stand 21. Third wall surface 214 is a surface extending in the Z-axis direction and the X-axis direction. Specifically, third wall surface 214 is a surface coinciding with the XZ plane and that is open on the +Y-axis direction side, i.e., a surface on the +Y-axis direction side of which storage space S1 is located.

Connector 40 is a member that, by being electrically connected to a terminal of storage battery 30 when storage battery 30 is placed on placement stand 21, supplies power for charging storage battery 30.

Protective plate 220 is a plate-shaped member that, when located in a first position, is disposed above connector 40 and protects connector 40. Connector 40 is exposed when protective plate 220 is located in a second position.

Support member 230 is a rectangular plate-shaped member that supports protective plate 220 in the first position. Support member 230 is a member that, by rotating, can switch between a first orientation, in which support member 230 supports protective plate 220, and a second orientation, in which support member 230 does not support protective plate 220.

Lock mechanisms 240 lock support member 230 in the first orientation. Lock mechanisms 240 have parts that restrict support member 230 from rotating to the second orientation.

First projecting parts 215 are disposed on placement surface 211, and are disposed on the +X-axis direction side at a distance, from first wall surface 212, equivalent to an X-axis direction width of storage battery 30. In other words, when storage battery 30 is placed in a proper orientation, first projecting parts 215 restrict storage battery 30 from moving in the +X-axis direction by contacting a side surface of storage battery 30 on the +X-axis direction side. First projecting parts 215 can therefore cause the side surface of storage battery 30 on the −X-axis direction side to be positioned within a predetermined distance from first wall surface 212. Accordingly, when a user places storage battery 30 on placement stand 21, placing storage battery 30 further on the first wall surface 212 side than first projecting parts 215 makes it easy to bring the side surface of storage battery 30 closer to first wall surface 212. The user can thus easily place storage battery 30 on placement stand 21 in the proper position.

The configurations of each constituent element will be described in detail hereinafter.

As illustrated in FIGS. 5 and 6, connector 40 is a part that protrudes in the +Z-axis direction from placement surface 211 of placement stand 21 and that is electrically connected to a terminal (not shown) of storage battery 30 when storage battery 30 is placed on placement stand 21. Connector 40 is disposed in a tilted state so that an end part of connector 40 on the +Z-axis direction side is located closer to the +X-axis direction side than a part of connector 40 on the −Z-axis direction side. Connector 40 is supported by placement stand 21 so as to be capable of rotating from the tilted state to point in the Z-axis direction. Connector 40 is biased to the tilted state. When storage battery 30 is placed on placement stand 21, connector 40 enters a recess (not shown) in which the terminal of storage battery 30 is provided, and is erected to point in the Z-axis direction by the recess in storage battery 30 which has been placed.

Storage battery 30 weighs approximately 10 kg, for example, and thus when the user places storage battery 30 on placement stand 21, the user will often move a lower part of storage battery 30 closer to placement stand 21 to carry out the placement. Accordingly, storage battery 30 is often placed while in a tilted orientation, in which a lower end is located further toward the −X-axis direction side than an upper end. Connector 40 is therefore biased to the tilted state in accordance with the tilted orientation of storage battery 30 during placement. As a result, connector 40 can easily be brought into contact with the terminal of storage battery 30 while reducing a load placed on connector 40.

Connector 40 is furthermore supported by placement stand 21 so as to be mobile in the Z-axis direction and biased in the +Z-axis direction. When storage battery 30 is not placed on placement stand 21, an upper end of connector 40 is located at a position higher than a position of the terminal when storage battery 30 is placed on placement stand 21. Accordingly, when storage battery 30 is placed on placement stand 21, the terminal of storage battery 30 pushes connector 40 in the −Z-axis direction. Connector 40 pushes the terminal of storage battery 30 in the +Z-axis direction as a result. As such, connector 40 and the terminal of storage battery 30 can be effectively connected when storage battery 30 is placed on the placement stand.

As illustrated in FIGS. 2, 4, and 5, when storage battery 30 is not placed on placement stand 21, protective plate 220 is disposed in the first position, the first position being further on the +Z-axis direction side than connector 40. Protective plate 220 is disposed in the first position by a first wall surface 212-side end part of protective plate 220 being supported by support member 230 (described later). When in the first position, protective plate 220 is disposed so that a height of protective plate 220 from placement surface 211 in the Z-axis direction increases as protective plate 220 progresses toward first wall surface 212, i.e., in the −X-axis direction. Accordingly, when in the first position, protective plate 220 is disposed tilted relative to placement surface 211 and first wall surface 212 so as to extend between placement surface 211 and first wall surface 212.

Additionally, by removing the support of support member 230, protective plate 220 can move from the first position to a second position further on the −Z-axis direction side than a +Z-axis direction-side end part of connector 40, i.e., further on the placement stand side. When the support of support member 230 is removed, protective plate 220 is pushed in the −Z-axis direction by storage battery 30, and is disposed in the second position as a result. Specifically, when in the second position, protective plate 220 is disposed in a position where protective plate 220 is in contact with placement surface 211 along placement surface 211. Thus when storage battery 30 is placed on placement stand 21, storage battery 30 can easily be put into a state where a +Z-axis direction-side end part of storage battery 30 is tilted in the direction opposite from first wall surface 212, i.e., in a direction away from the +X-axis direction side. The user can therefore easily place storage battery 30 on placement stand 21.

Protective plate 220 is parallel to the Y-axis direction both when in the first position and when in the second position. Protective plate 220 moves to the second position by moving in the +X-axis direction, while rotating counter-clockwise as seen from the −Y-axis direction side, from the first position. Conversely, protective plate 220 moves to the first position by moving in the −+X-axis direction, while rotating clockwise as seen from the −Y-axis direction side, from the second position.

The movement of protective plate 220 will be described with reference to FIG. 7.

Figure 7:
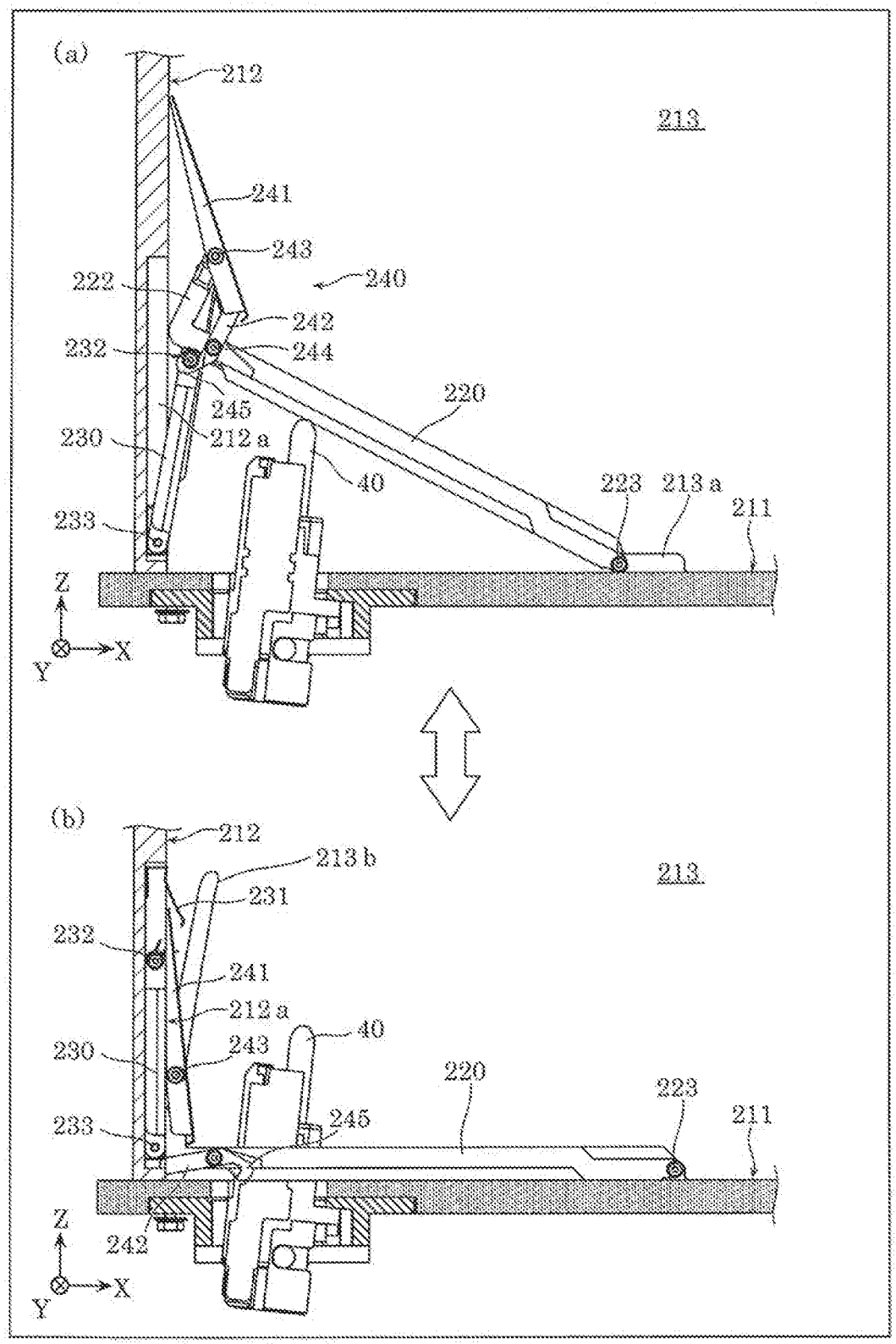
FIG. 7 is an enlarged view of the content of FIGS. 5 and 6 for illustrating the states of a protective plate, a support member, and lock mechanisms.

FIG. 7 is an enlarged view of the content of FIGS. 5 and 6 for illustrating the states of the protective plate, the support member, and the lock mechanisms. (a) in FIG. 7 illustrates protective plate 220 in the first position, i.e., corresponds to FIG. 6, and (b) in FIG. 7 illustrates protective plate 220 in the second position.

Protective plate 220 has a substantially L-shaped cross-section as seen from the Y-axis direction. Specifically, protective plate 220 includes a pair of curved parts 222 in which a −X-axis direction-side end part of protective plate 220 is bent in the +Z-axis direction on both sides of protective plate 220 in the Y-axis direction. A tip of each curved part 222 includes projection 243, which protrudes in the direction opposite from the other curved part 222. In other words, protective plate 220 includes a pair of projections 243 at the tips of the pair of curved parts 222. The pair of projections 243 fit into guide grooves 213*b* formed in second wall surface 213 and third wall surface 214 located on both sides of protective plate 220 in the Y-axis direction. As illustrated in (b) of FIG. 7, guide groove 213*b* is a groove provided in second wall surface 213, but a groove having the same shape is also formed in third wall surface 214 that opposes second wall surface 213.

Protective plate 220 also includes, on a +X-axis direction-side end part of protective plate 220, a pair of projections 223 protruding toward both sides in the Y-axis direction. The pair of projections 223 fit into guide grooves 213*a* formed in second wall surface 213 and third wall surface 214. As illustrated in (a) of FIG. 7, guide groove 213*a* is a groove provided in second wall surface 213, but a groove having the same shape is also formed in third wall surface that opposes second wall surface 213.

In this manner, protective plate 220 includes, on respective ends of protective plate 220 in the X-axis direction, the pairs of projections 223 and 243, which fit into respective guide grooves. Protective plate 220 can therefore move in a state where the movement between the first position and the second position is restricted.

As illustrated in FIG. 1 and (a) of FIG. 3, protective plate 220 includes opening 221. Opening 221 is an opening through which connector 40 passes when protective plate 220 moves to the second position. In other words, protective plate 220 is disposed so as to cover connector 40 when protective plate 220 is located in the first position (see FIG. 5, for example), but when protective plate 220 is located in the second position, connector 40 passes through opening 221 (see FIG. 6, for example). Accordingly, connector 40 can be effectively protected when protective plate 220 is in the first position, and connector 40 can be exposed easily when protective plate 220 is in the second position.

Note that the first wall surface 212-side end part of protective plate 220 is connected, in the +Z-axis direction, by a tension spring (not shown) which is connected to first wall surface 212 further on the +Z-axis direction side than the stated end part. In other words, the first wall surface 212-side end part of protective plate 220 is biased in the +Z-axis direction, and is therefore biased toward the first position from the second position.

Support member 230 is a member that can move between a first orientation, in which protective plate 220 is supported in the first position by support member 230 supporting the first wall surface 212-side end part of protective plate 220, and a second orientation, in which protective plate 220 is not supported. Support member 230 is a rectangular plate-shaped member, for example. Support member 230 is a member connected in a freely-rotatable state to rotation shaft 233, which is disposed near a location where placement surface 211 and first wall surface 212 intersect (see FIG. 7) and extends in the Y-axis direction. Support member 230 assumes the first orientation by being positioned in a first rotated position rotated away from first wall surface 212, i.e., clockwise as seen from the −Y-axis direction side, and assumes the second orientation by being positioned in a second rotated position following first wall surface 212.

Note that at rotation shaft 233, support member 230 includes a spring (e.g., a torsion spring; not shown) that biases support member 230 clockwise as seen from the −Y-axis direction. That is, support member 230 is biased from the second orientation toward the first orientation.

In other words, in the first orientation, support member 230 is positioned such that an upper end of support member 230 is separated from first wall surface 212. A bottom surface of the first wall surface 212-side end part of protective plate 220 is therefore supported by the upper end of support member 230. On the other hand, in the second orientation, support member 230 is disposed along first wall surface 212, and is therefore located further on the first wall surface 212 side than the first wall surface 212-side end part of protective plate 220. Support member 230 thus separates from the first wall surface 212-side end part of protective plate 220, and does not support protective plate 220.

Note that first wall surface 212 includes recess 212a that contains support member 230 when in the second orientation. As such, situations where support member 230 interferes with storage battery 30 when storage battery 30 is placed on placement stand 21 can be suppressed. More space for containing storage battery 30 can be secured as well.

Support member 230 includes protruding part 231. Protruding part 231 is disposed in a different position from lock mechanisms 240 (described later), and protrudes by a lower amount than an amount by which first members 241 of lock mechanisms 240 protrude from first wall surface 212. Specifically, protruding part 231 is disposed in a position, of the +Z-axis direction-side end part of support member 230, located between both ends of that end part in the Y-axis direction, i.e., between the pair of lock mechanisms 240. Protruding part 231 is, for example, a plate spring protruding from first wall surface 212.

When support member 230 is not being locked by lock mechanisms 240, protruding part 231 is pushed toward first wall surface 212, and support member 230 moves from the first orientation to the second orientation as a result. Support member 230 also includes a pair of projections 232 that protrude outward, in the Y-axis direction, on both sides of the first wall surface 212-side end part of support member 230.

Support member 230 includes a plate-shaped shutter 250 that covers opening 221 in protective plate 220 when in the first orientation. Shutter 250 is connected in a freely-rotatable state by a rotation shaft, which extends in the Y-axis direction, to the end part of support member 230 that supports protective plate 220, i.e., the +Z-axis direction-side end part of support member 230. This rotation shaft is provided in a position corresponding to the pair of projections 232. Shutter 250 is biased in a direction of rotation toward first wall surface 212, from the side opposite from the first wall surface 212 side of support member 230. In other words, shutter 250 is biased so as to rotate counter-clockwise about the rotation shaft as seen from the −Y-axis direction. Shutter 250 covers opening 221 in protective plate 220 when support member 230 has moved to the first orientation.

Accordingly, even if protective plate 220 includes opening 221, opening 221 is covered by shutter 250 when protective plate 220 is supported in the first position by support member 230, and thus connector 40 can be effectively protected.

The pair of lock mechanisms 240 lock support member 230 in the first orientation. The pair of lock mechanisms 240 are provided on respective ends of protective plate 220 in the Y-axis direction, and lock support member 230 in the first orientation at those respective ends. The pair of lock mechanisms 240 have the same configuration, and thus only one of lock mechanisms 240 will be described hereinafter.

Lock mechanism 240 includes first member 241 and second member 242. First member 241 is a rectangular plate-shaped member, disposed so that longitudinal direction sides are tilted with respect to the Z-axis direction and lateral direction sides are substantially parallel to the Y-axis direction. First member 241 is rotatably connected to a tip of curved part 222 of protective plate 220 at a position between both ends of first member 241 in the longitudinal direction. First member 241 is rotatably connected to curved part 222 using the position of the pair of projections 243 at the tip of curved part 222 as an axis of rotation. First member 241 is biased counter-clockwise, as seen from the −Y-axis direction, about the stated axis of rotation by a spring (e.g., a torsion spring).

First member 241 is disposed in a tilted manner, and is therefore an example of a first protruding part that protrudes from first wall surface 212. In other words, when lock mechanism 240 locks support member 230, the locking of support member 230 is released by first member 241 being disposed in a first protruding position protruding from first wall surface 212, and being pushed to a second protruding position on the first wall surface 212 side from the first protruding position.

Second member 242 is rotatably connected at rotation shaft 244 located on an outer side part of protective plate 220 in the Y-axis direction. Second member 242 includes hooks 245 at a tip of second member 242. Hooks 245 lock support member 230 in the first orientation by hooking onto the pair of projections 232 of support member 230. Second member 242 is biased clockwise, as seen from the −Y-axis direction, about rotation shaft 244 by a spring (e.g., a torsion spring).

Specifically, when second member 242 has rotated clockwise as seen from the −Y-axis direction due to first member 241 being pushed toward first wall surface 212 side, an end part on the opposite side of rotation shaft 244 from hook 245 is pushed by first member 241 and rotates counter-clockwise. As a result, hooks 245 separate from the pair of projections 232, and the locking of support member 230 is released.

2. Principles

Here, principles of the lock mechanisms releasing when storage battery 30 is placed on placement stand 21 will be described with reference to FIGS. 8 and 9, in addition to FIGS. 5 to 7.

Figure 8:
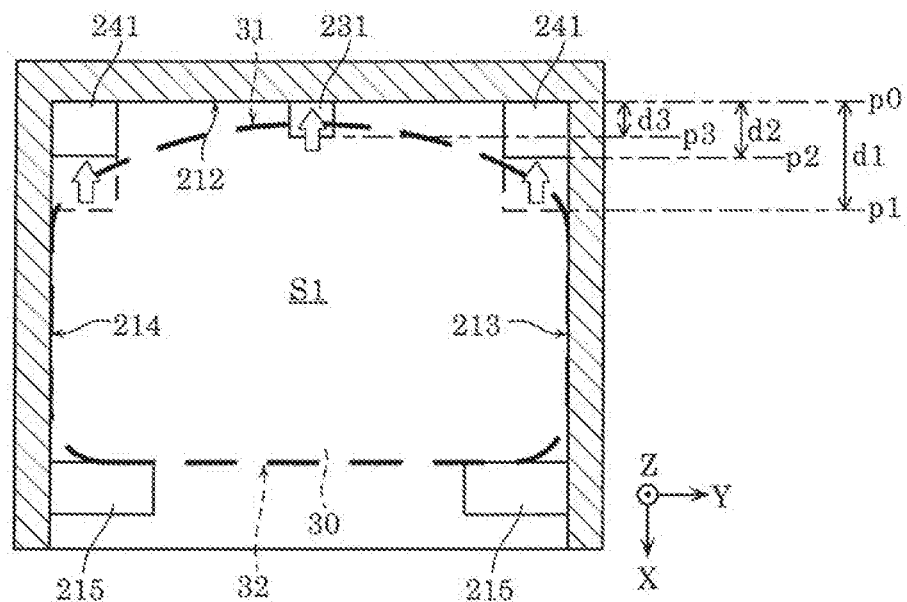
FIG. 8 is a schematic diagram illustrating movement of first members of the lock mechanisms and a protruding part of the support member, viewing the placement stand from a Z-axis direction.
Figure 9:
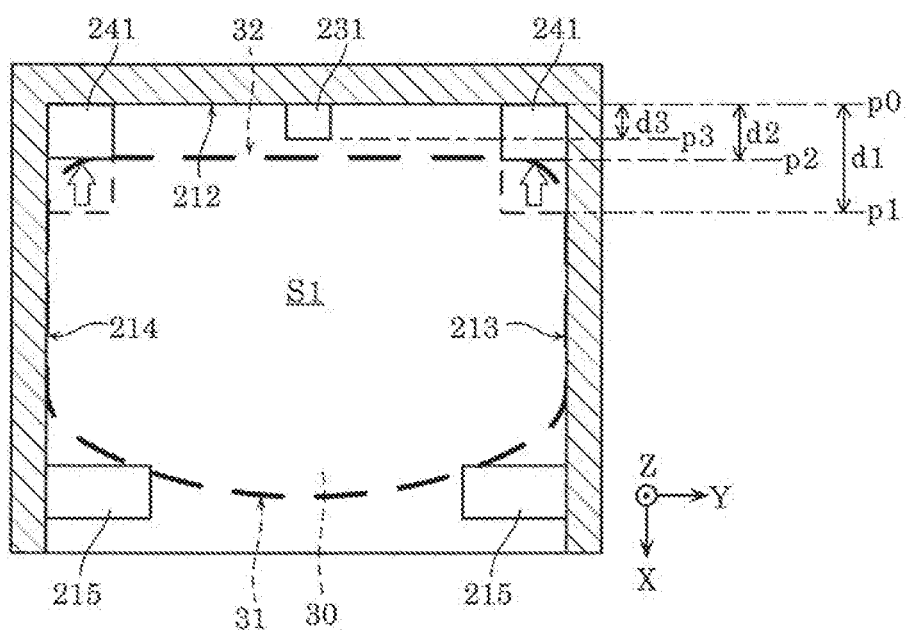
FIG. 9 is a schematic diagram illustrating movement of the first members of the lock mechanisms and the protruding part of the support member, viewing the placement stand from the Z-axis direction.

FIGS. 8 and 9 are schematic diagrams illustrating movement of the first members of the lock mechanisms and the protruding part of the support member, viewing the placement stand from the Z-axis direction.

Note that FIG. 8 is a diagram illustrating movement of first members 241 and protruding part 231 when storage battery 30 is placed in the proper orientation, and FIG. 9 is a diagram illustrating movement of first members 241 and protruding part 231 when storage battery 30 is placed in an orientation different from the proper orientation. Shapes are exaggerated in FIGS. 8 and 9 for descriptive purposes.

As illustrated in FIGS. 8 and 9, storage battery 30 is configured so that when in the proper orientation, rear side surface 31 that opposes first wall surface 212 has a curved shape in which, seen from the Z-axis direction, a central part in the Y-axis direction bulges rearward in the X-axis direction further than both Y-axis direction end parts. Furthermore, storage battery 30 is configured so that when in the proper orientation, front side surface 32, located on the side opposite from the side where first wall surface 212 is located, has a flat shape as seen from the Z-axis direction.

When lock mechanisms 240 lock support member 230, the locking of support member 230 is released by first members 241 being disposed in first protruding position p1 protruding from position p0 of first wall surface 212 by first distance d1, and being pushed to second protruding position p2 on the first wall surface 212 side from first protruding position p1. Second protruding position p2 is a position distanced from position p0 of first wall surface 212 by second distance d2. For example, as illustrated in FIGS. 8 and 9, first members 241 are pushed toward first wall surface 212 by both Y-axis direction ends of a −X-axis direction side surface of storage battery 30. Note that first members 241 will not move past second protruding position p2 in the direction of first wall surface 212 even if pushed toward first wall surface 212 by storage battery 30.

Next, in FIG. 8, rear side surface 31 of storage battery 30 has a curved shape in which a central part in the Y-axis direction bulges outward. As such, even if both Y-axis direction end parts of rear side surface 31 of storage battery 30 contact first members 241 at second protruding position p2, protruding part 231, which protrudes beyond second protruding position p2 to third protruding position p3 of first wall surface 212, can be pushed toward first wall surface 212. The support of protective plate 220 by support member 230 can be removed as a result.

Note that third protruding position p3 is a position distanced from position p0 of first wall surface 212 by third distance d3. First distance d1 is greater than second distance d2, and second distance d2 is greater than third distance d3.

On the other hand, in FIG. 9, front side surface 32 of storage battery 30 has a flat shape, and thus when both Y-axis direction end parts of front side surface 32 contact first members 241 at second protruding position p2, storage battery 30 cannot move any further toward first wall surface 212. In other words, a Y-axis direction central part of front side surface 32 does not reach protruding part 231, which means that protruding part 231 cannot be pushed toward first wall surface 212, and the support of protective plate 220 by support member 230 cannot be removed. As such, if the user attempts to place storage battery 30 on placement stand 21 in an orientation different from the proper orientation, protective plate 220 will remain supported in the first position, and the base surface of storage battery 30 will be unable to move to the position of placement surface 211. In other words, if the user attempts to place storage battery 30 in an orientation different from the proper orientation, with a base surface different from the base surface including the terminal facing connector 40, the support by support member 230 will not be removed. Thus protective plate 220 can reduce situations where connector 40 is damaged by a base surface of storage battery 30 different from the base surface including the terminal.

3. Movement of Protective Plate

Movement of protective plate 220, support member 230, and lock mechanisms 240 will be described next with reference to FIGS. 10A to 11B.

Figure 10A:
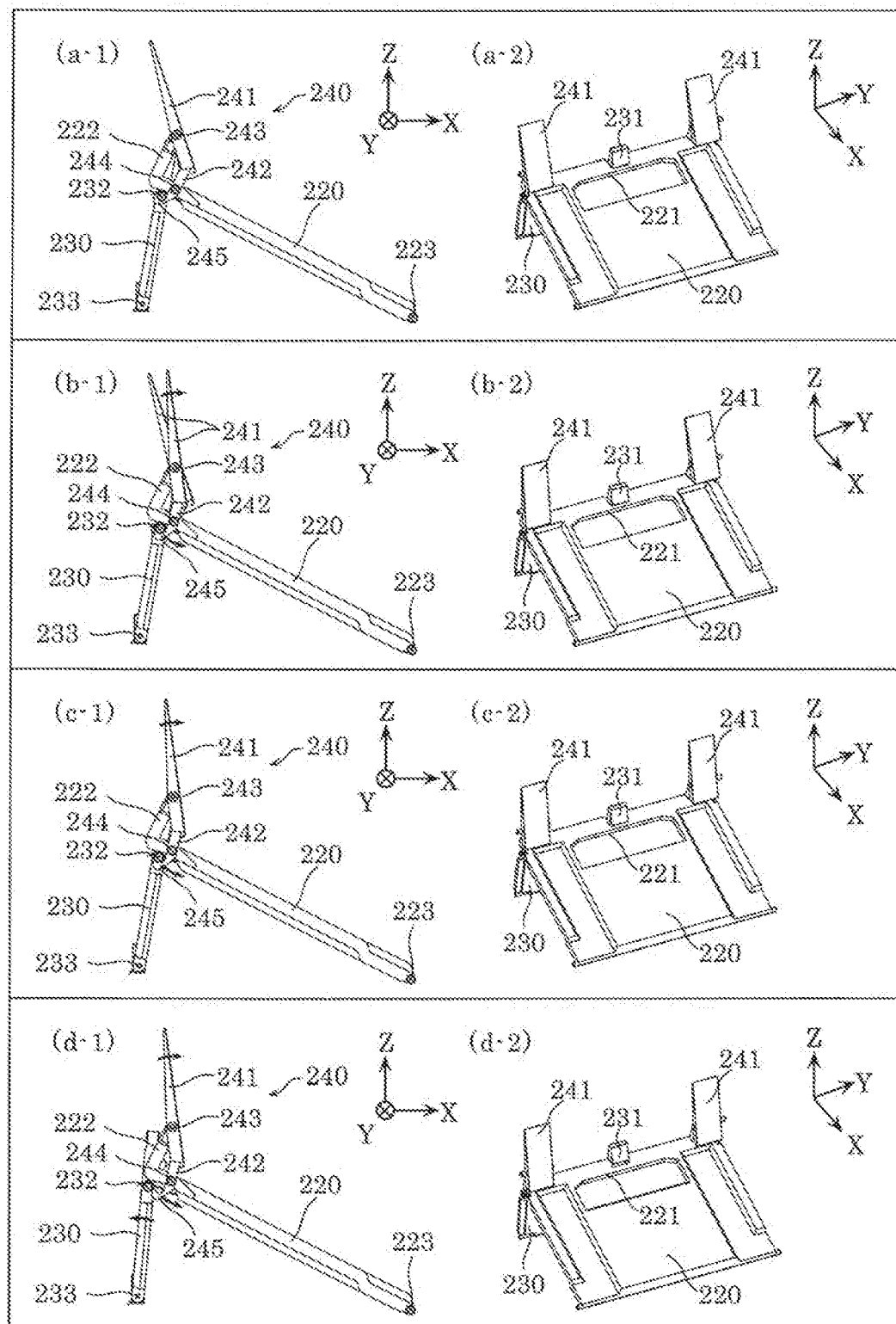
FIG. 10A is a diagram illustrating movement of various members when locking by the lock mechanisms is released and support of the protective plate by the support member is removed.
Figure 10B:
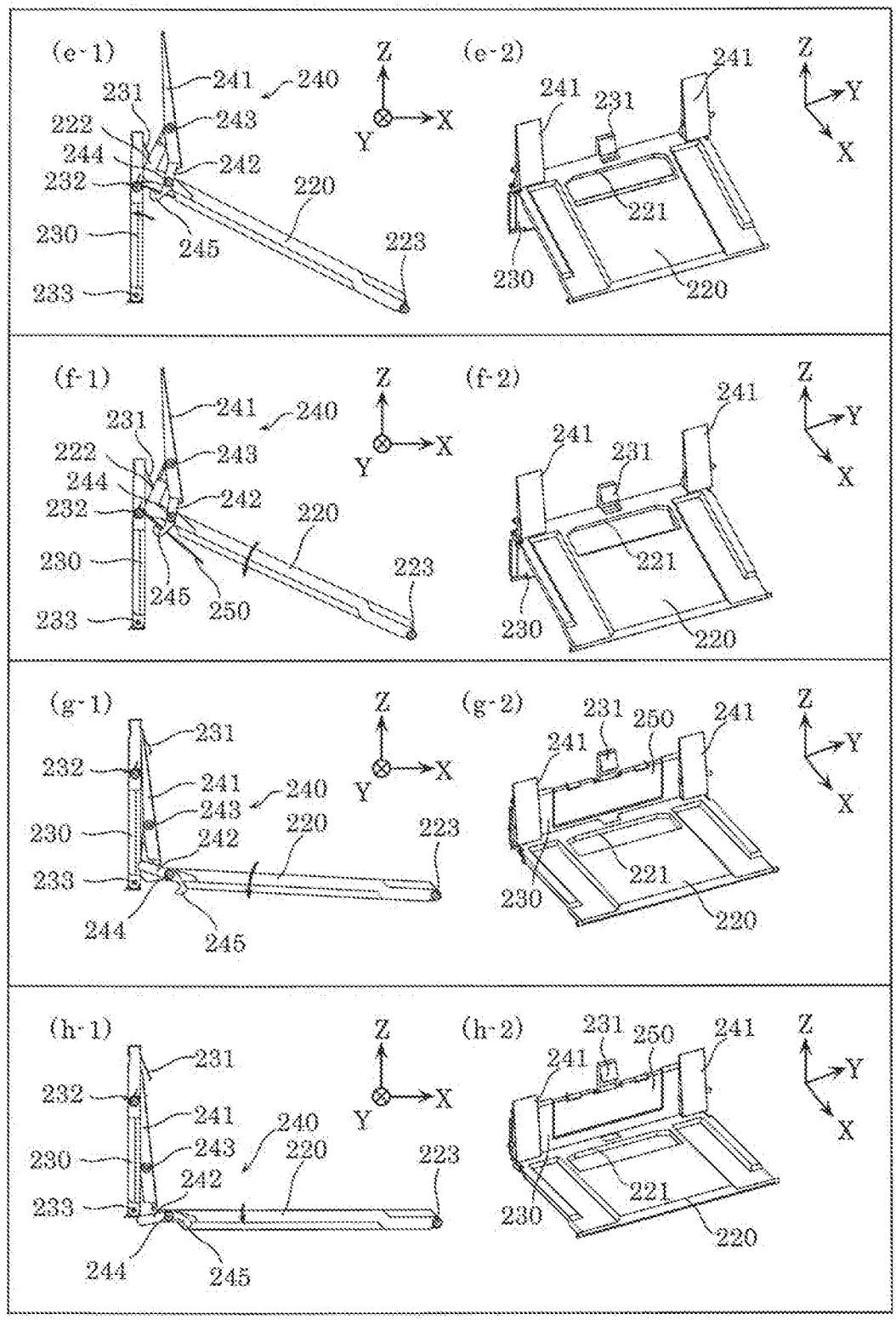
FIG. 10B is a diagram illustrating movement of various members when locking by the lock mechanisms is released and support of the protective plate by the support member is removed.

FIGS. 10A and 10B are diagrams illustrating movement of various members when locking by the lock mechanisms is released and support of the protective plate by the support member is removed. Note that in FIGS. 10A and 10B, (x-1) is a side view of protective plate 220, support member 230, and lock mechanisms 240 from the Y-axis direction, and (x-2) is a perspective view of protective plate 220, support member 230, and lock mechanisms 240 in the same state as that illustrated in (x-1). Note also that x is one of a to h.

(a-1) and (a-2) are diagrams illustrating a state in which protective plate 220 is supported in the first position by support member 230. This is a state in which support member 230 is locked in the first orientation by lock mechanisms 240.

(b-1) and (b-2) are diagrams illustrating a state where only first member 241 of the −Y-axis direction-side lock mechanism 240 has been pushed in the −X-axis direction. In this manner, even if only first member 241 of one of lock mechanisms 240 is pushed, first member 241 of the other lock mechanism 240 is not pushed, and thus support member 230 cannot be released by lock mechanisms 240.

(c-1) and (c-2) are diagrams illustrating a state where the pair of first members 241 of the pair of lock mechanisms 240 have been pushed in the −X-axis direction. As a result, the pair of first members 241 rotate clockwise, as seen from the −Y-axis direction, about the axis of rotation located at projections 243, and second members 242 rotate counter-clockwise about rotation shaft 244. As second members 242 rotate, hooks 245 move away from the pair of projections 232.

(d-1) and (d-2) are diagrams illustrating protruding part 231 being pushed in the −X-axis direction in a state where the locking of support member 230 by lock mechanisms 240 has been released. When the locking by lock mechanisms 240 is released, protruding part 231 is being pushed in the −X-axis direction, and support member 230 rotates counter-clockwise, as seen from the −Y-axis direction, about rotation shaft 233. Support member 230 moves from the first orientation to the second orientation as a result.

(e-1) and (e-2) are diagrams illustrating a state where support member 230 is in the second orientation. Support member 230 is contained within recess 212a formed in first wall surface 212 as a result.

(f-1), (f-2), (g-1), (g-2), (h-1), and (h-2) are diagrams illustrating movement of protective plate 220 from the first position to the second position. In this case, although not illustrated here, protective plate 220 receives the load from storage battery 30 and moves downward to the second position as a result. The terminal of storage battery 30 is connected to connector 40, which is exposed from protective plate 220, as a result. Note that in (f-1) and (f-2), the first wall surface 212-side end part of protective plate 220 moves to a position lower than the axis of rotation of shutter 250 (the position of projections 232), and thus shutter 250 moves from covering opening 221 to uncovering opening 221. Opening 221 is uncovered as a result.

Figure 11A:
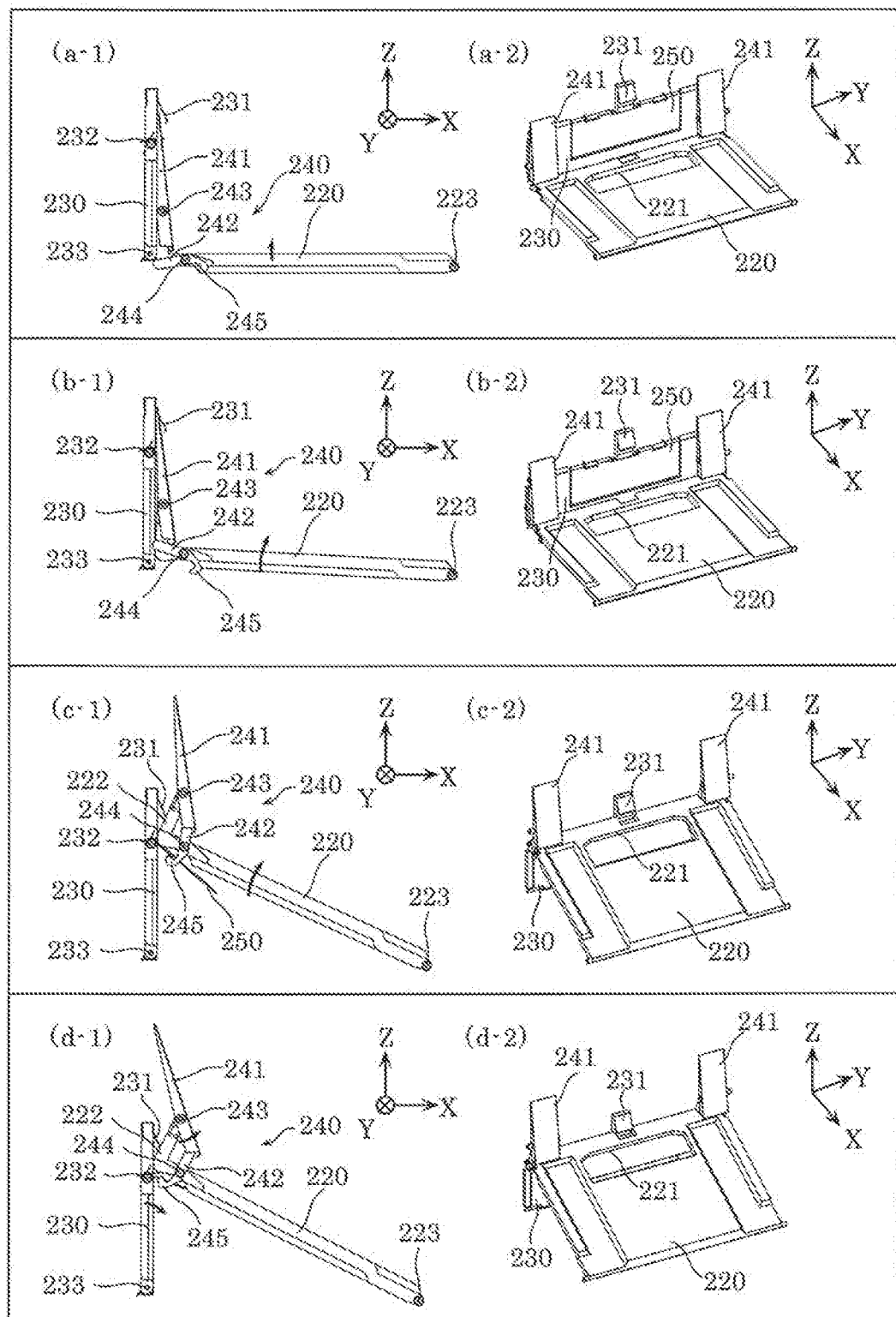
FIG. 11A is a diagram illustrating movement of various members when the protective plate returns from a second position to a first position upon the storage battery being removed.
Figure 11B:
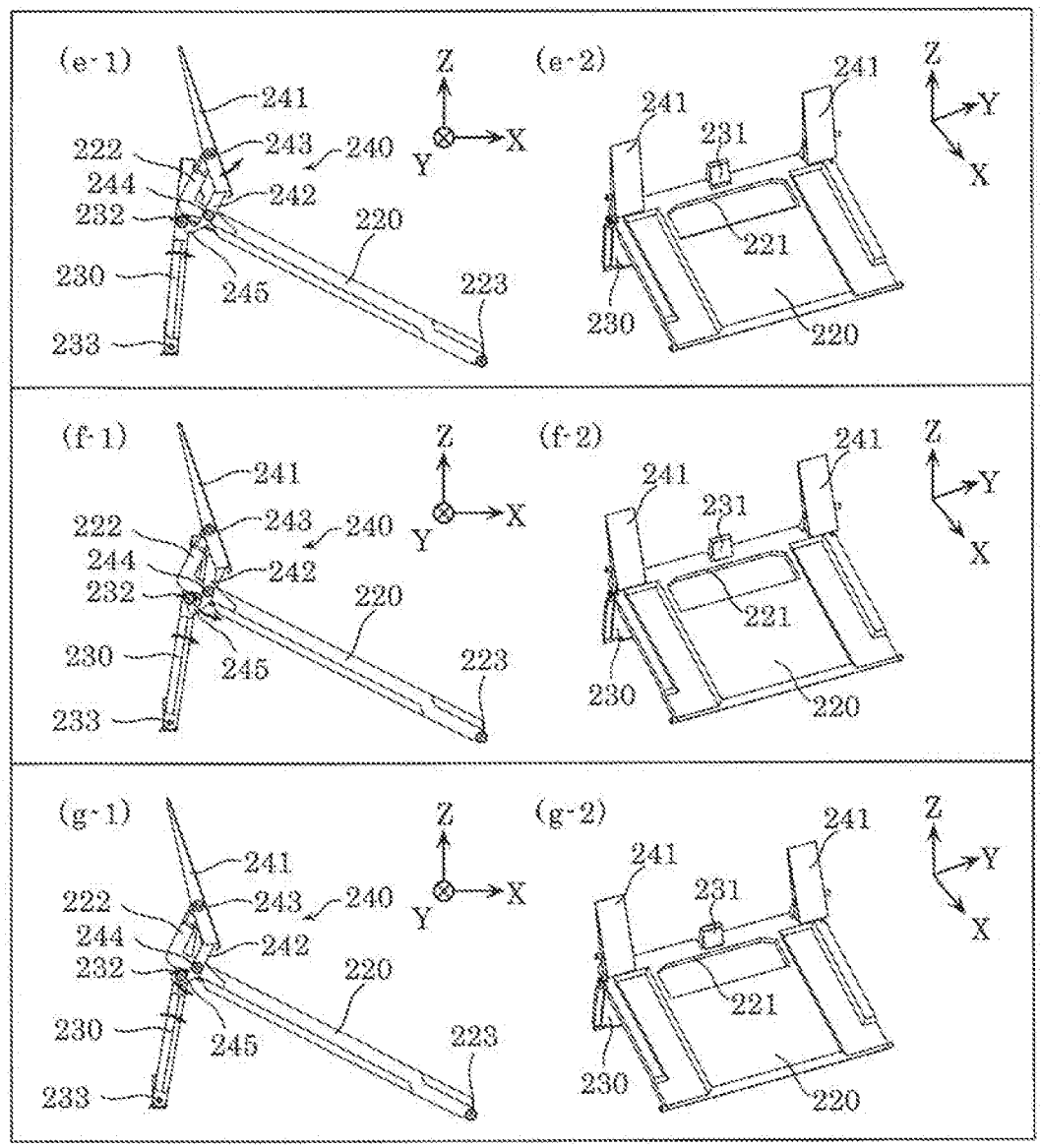
FIG. 11B is a diagram illustrating movement of various members when the protective plate returns from the second position to the first position upon the storage battery being removed.

FIGS. 11A and 11B are diagrams illustrating movement of various members when the protective plate returns from the second position to the first position upon the storage battery being removed. Note that in FIGS. 11A and 11B, (y-1) is a side view of protective plate 220, support member 230, and lock mechanisms 240 from the Y-axis direction, and (y-2) is a perspective view of protective plate 220, support member 230, and lock mechanisms 240 in the same state as that illustrated in (y-1). Note also that y is one of a to g.

(a-1), (a-2), (b-1), (b-2), (c-1), and (c-2) are diagrams illustrating movement of protective plate 220 from the second position to the first position. In this case, when storage battery 30 is removed, the load from storage battery 30 is removed, and protective plate 220 is raised in the +Z-axis direction by the tension spring connected to the first wall surface 212-side end part of protective plate 220. Protective plate 220 moves from the second position to the first position as a result. Note that in (b-1) and (b-2), second members 242 are rotated clockwise by the torsion spring, and make contact with first members 241. Additionally, in (c-1) and (c-2), the first wall surface 212-side end part of protective plate 220 moves to a position higher than the axis of rotation of shutter 250 (the position of projections 232). Shutter 250 is biased in the counter-clockwise direction as seen from the −Y-axis direction, and therefore rotates counter-clockwise and covers opening 221.

(d-1) and (d-2) are diagrams illustrating a state where protective plate 220 is located at the first position. Support member 230 can move to the first orientation as a result of the first wall surface 212-side end part of protective plate 220 moving above support member 230.

(e-1), (e-2), (f-1), (f-2), (g-1), and (g-2) are diagrams illustrating movement of support member 230 from the second orientation to the first orientation. Support member 230 is biased clockwise, as seen from the Y-axis direction, by the torsion spring, and therefore moves from the second orientation to the first orientation. At this time, first members 241 are biased in the counter-clockwise direction by the torsion spring, and therefore rotate counter-clockwise, returning from the second protruding position to the first protruding position as a result. As support member 230 moves to the first orientation, projections 232 of support member 230 catch on hooks 245 of second members 242, and support member 230 is locked in the first orientation by lock mechanisms 240.

A relationship between the orientation of support member 230 and the position of shutter 250 will be described next.

Figure 12:
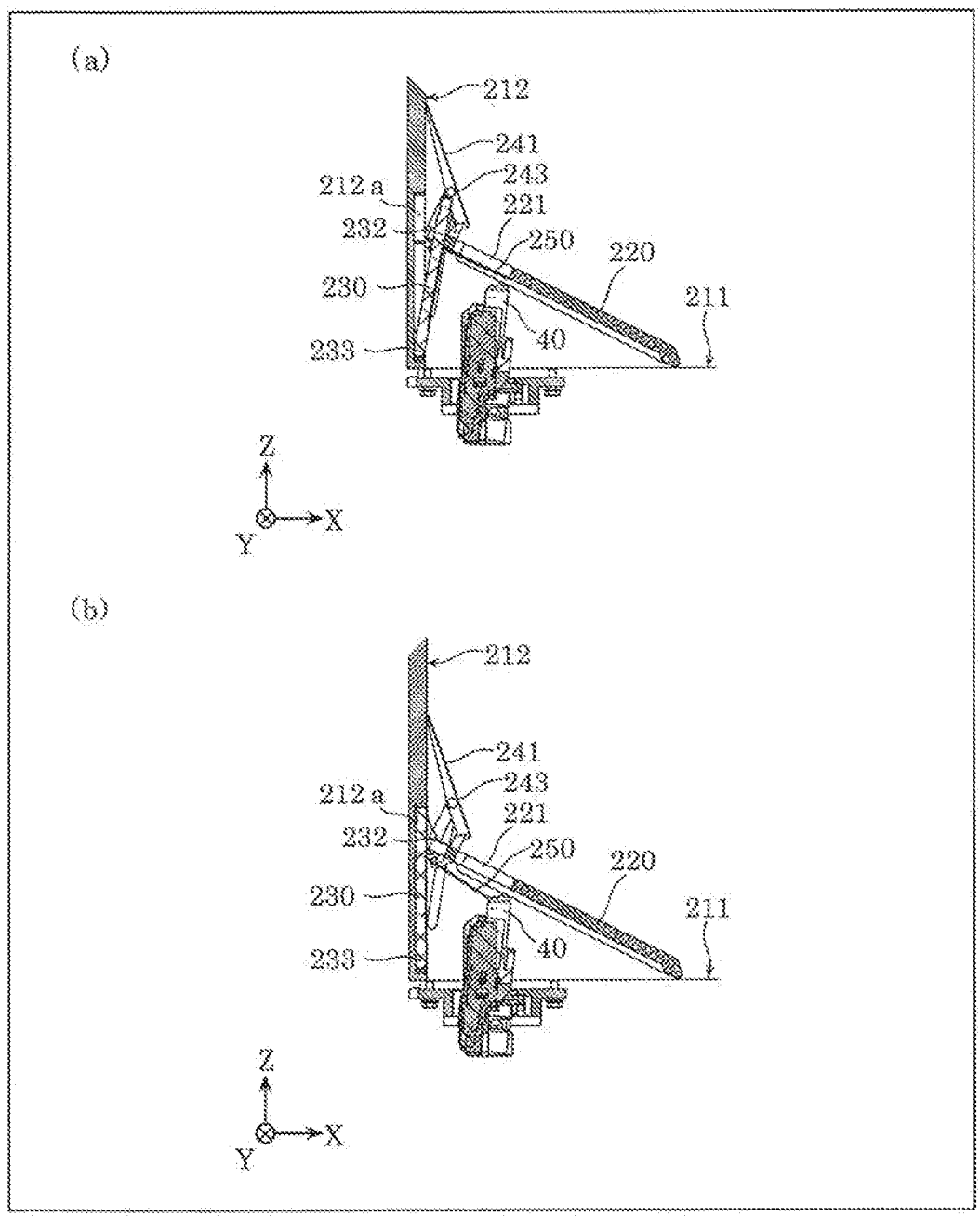
FIG. 12 is a diagram illustrating a relationship between an orientation of the support member and a position of a shutter.

FIG. 12 is a diagram illustrating a relationship between the orientation of the support member and the position of the shutter.

As illustrated in (a) of FIG. 12, when support member 230 is in the first orientation, shutter 250 is located in a position overlapping connector 40 as seen from the Z-axis direction. On the other hand, as illustrated in (b) of FIG. 12, shutter 250 moves toward first wall surface 212 when support member 230 is in the second orientation.

In other words, when protective plate 220 is supported by support member 230, shutter 250 will contact connector 40 even when pushed from above, which ensures that opening 221 will not be uncovered and connector 40 will therefore not be exposed. On the other hand, when protective plate 220 is not supported by support member 230, shutter 250 is pushed by protective plate 220 as protective plate 220 moves to the second position, and rotates clockwise, as seen from the Y-axis direction, as a result. At this time, shutter 250 is moving toward first wall surface 212, and can therefore rotate clockwise, without contacting connector 40, and uncover opening 221.

Accordingly, when opening 221 in protective plate 220 is being covered by shutter 250, shutter 250 will contact connector 40 even if, for example, a user has mistakenly inserted their finger into opening 221. Connector 40 can therefore be effectively protected.

4. Effects, Etc.

According to charging device 1 of the present embodiment, in a state where first members 241 of lock mechanisms 240 are moved from first protruding position p1 to second protruding position p2 and the locking of support member 230 is released, when protruding part 231 is pushed toward first wall surface 212, the support of protective plate 220 by support member 230 is removed, and protective plate 220 can move from the first position to the second position. Accordingly, as long as one of first members 241 and protruding part 231 is not pushed toward first wall surface 212, protective plate 220 can be restricted from moving to the second position. Connector 40 can be effectively protected by protective plate 220 as a result.

If, for example, the side surface of storage battery 30 opposing first wall surface 212 does not have a predetermined shape (e.g., a curved shape) which enables both first members 241 and protruding part 231 to be pushed toward first wall surface 212, protective plate 220 will not move to the second position. This makes it possible to suppress damage to connector 40 resulting from connector 40 not coinciding with the position of the terminal in storage battery 30. On the other hand, if the side surface of storage battery 30 opposing first wall surface 212 has the predetermined shape, protective plate 220 will move to the second position. It is therefore sufficient to form the side surface of storage battery 30 opposing the first wall surface 212-side of placement stand 21 in the predetermined shape, and to form a side surface different from the side surface of storage battery 30 opposing first wall surface 212 in a shape different from the predetermined shape, when the storage battery is placed in the proper orientation, i.e., an orientation where the positions of connector 40 and the terminal of storage battery 30 coincide when storage battery 30 is placed on placement stand 21. Through this, protective plate 220 can be moved to the second position, and the terminal of storage battery 30 can be connected to connector 40, only when storage battery 30 is placed on placement stand 21 while in the proper orientation. Accordingly, the user can easily place storage battery 30 on placement stand 21 in the proper orientation. Furthermore, even if storage battery 30 is placed on placement stand 21 in a different orientation from the proper orientation, situations where connector 40 is damaged by storage battery 30 can be suppressed.

5. Other

In the foregoing embodiment, the shape of rear side surface 31 of storage battery 30, which opposes first wall surface 212 when storage battery 30 is in the proper orientation, is described as being curved, with a central part in the Y-axis direction bulging outward more than both ends. However, the shape is not limited thereto. Consider, for example, a situation where a first wall surface of charging device has a concave shape, the first member is disposed in the center in the Y-axis direction as the first protruding part, and the second protruding parts are disposed at end parts in the Y-axis direction. In this case, the shape of a side surface of the storage battery opposing the first wall surface when the storage battery is in the proper orientation is formed flat, and a side surface different from the side surface opposing the first wall surface is formed in a convex shape corresponding to the concave shape of the first wall surface. Thus even when level, the first wall surface has a concave shape, the first protruding part is disposed in a central part in the Y-axis direction, and the second protruding parts are disposed on both ends in the Y-axis direction. Accordingly, even if the first protruding part is pushed as far as the second protruding position, the second protruding parts can be pushed toward the first wall surface at both end parts of the storage battery in the Y-axis direction. On the other hand, if the convex surface opposes the first wall surface, the second protruding parts cannot be pushed at both ends in the Y-axis direction when the first protruding part is pushed toward the second protruding position at the central part in the Y-axis direction. Thus similar effects can be achieved even with a configuration using a shape different from that in the embodiment.

The foregoing embodiment also described a configuration in which protruding part 231 is disposed between the two lock mechanisms 240. However, two lock mechanisms 240 need not be provided as described above, and the second protruding part may be disposed anywhere as long as it is in a different position from the lock mechanisms in the Y-axis direction.

The foregoing embodiment has been described as an example of the technique according to the present disclosure. The accompanying drawings and detailed descriptions have been provided to that end.

As such, the constituent elements indicated in the accompanying drawings and the detailed descriptions include not only constituent elements necessary to solve the technical problem, but also constituent elements not necessary to solve the problem but used to exemplify the above-described technique. Those unnecessary constituent elements being included in the accompanying drawings, the detailed description, and so on should therefore not be interpreted as meaning that the unnecessary constituent elements are in fact necessary.

Additionally, the foregoing embodiment is provided merely as one example of the technique according to the present disclosure, and thus many changes, substitutions, additions, omissions, and the like are possible within the scope of the claims or a scope equivalent thereto.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure can be applied in a charging device or the like that can effectively protect a connector for charging.

What is claimed is:

1. A charging device that charges a storage battery placed on a placement stand, the device comprising:
   a connector that protrudes in a first direction from a placement surface of the placement stand and that electrically connects to a terminal of the storage battery placed on the placement stand;
   a protective plate disposed in a first position, the first position located further in the first direction than the connector;
   a wall surface extending in the first direction and a second direction substantially orthogonal to the first direction;
   a support member capable of moving to be in a first orientation and a second orientation, the support member supporting the protective plate in the first position when in the first orientation and not supporting the protective plate when in the second orientation; and
   a lock mechanism that locks the support member in the first orientation,
   wherein the lock mechanism includes a first protruding part that, when the support member is locked, is disposed in a first protruding position protruding from the wall surface and that releases locking of the support member by being pushed from the first protruding position to a second protruding position closer to the wall surface than the first protruding position,
   the support member (i) includes a second protruding part disposed in a different position from the first protruding part in the second direction and protruding by an amount smaller than a distance from the wall surface to the second protruding position, and (ii) moves from the first orientation to the second orientation by the second protruding part being pushed toward the wall surface in a state where the locking by the lock mechanism is released, and
   when the support member has moved to the second orientation, the protective plate is capable of moving to a second position closer to the placement stand than a first direction-side end part of the connector.

2. The charging device according to claim 1,
   wherein two lock mechanisms, each of which is the lock mechanism, are provided at two ends of the support member in the second direction, the two lock mechanisms locking the support member in the first orientation at the two ends, and
   the second protruding part is disposed between the two lock mechanisms provided at the two ends.

3. The charging device according to claim 2,
   wherein the support member includes a pair of projections protruding outward toward both sides in the second direction from a wall surface-side end part of the support member, and
   each of the two lock mechanisms includes a hook, the hooks locking the support member by hooking onto the pair of projections when the first protruding part is positioned in the first protruding position, and releasing the locking of the support member by separating from the pair of projections when the first protruding part is positioned in the second protruding position.

4. The charging device according to claim 1,
wherein the support member is a plate-shaped member connected in a freely-rotatable state to a first rotation shaft, the first rotation shaft being disposed near a location where the placement surface and the wall surface of the placement stand intersect and extending in the second direction, and
the support member assumes the first orientation by being positioned at a first rotated position rotated in a direction away from the wall surface, and assumes the second orientation by being positioned at a second rotated position along the wall surface.

5. The charging device according to claim 1,
wherein the wall surface includes a recess that contains the support member when the support member is in the second orientation.

6. The charging device according to claim 1,
wherein when the protective plate is disposed in the first position, a height of the protective plate from the placement surface in the first direction increases with decreasing distance to the wall surface, and
when the protective plate is in the second position, the protective plate is disposed along the placement surface and in contact with the placement surface.

7. The charging device according to claim 1,
wherein the protective plate (i) has an opening, (ii) is disposed so as to cover the connector when the protective plate is positioned in the first position, and (iii) when the protective plate is positioned in the second position, the connector passes through the opening.

8. The charging device according to claim 7,
wherein the support member includes a shutter that has a plate shape and that covers the opening in the protective plate when the support member is in the first orientation, and
the shutter (i) is connected, in a freely-rotatable state, by a second rotation shaft, to an end part of the support member on a side of the support member that supports the protective plate, the second rotation shaft extending in the second direction, (ii) is biased in a direction of rotation toward the wall surface, from the opposite side of a wall surface-side of the support member, and (iii) covers the opening in the protective plate when the support member has moved to the first orientation.

9. The charging device according to claim 8,
wherein when the support member is in the first orientation, the shutter is positioned in a position overlapping the connector as seen from the first direction, and when the support member is in the second orientation, the shutter moves toward the wall surface.

10. The charging device according to claim 1, further comprising:
a first projecting part disposed on the placement surface at a distance from the wall surface, in a third direction, equivalent to a width of the storage battery in the third direction, the third direction being substantially orthogonal to the first direction and the second direction.

* * * * *